(12) United States Patent
Blankley, Jr. et al.

(10) Patent No.: US 11,623,456 B2
(45) Date of Patent: Apr. 11, 2023

(54) LABEL PRINTER WITH BARCODE SHIFTING AND SCALE INCORPORATING SUCH A LABEL PRINTER

(71) Applicant: ILLINOIS TOOL WORKS INC., Glenview, IL (US)

(72) Inventors: Randy L. Blankley, Jr., Springfield, OH (US); Robert S. Davis, Tipp City, OH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/380,558

(22) Filed: Jul. 20, 2021

(65) Prior Publication Data

US 2022/0040994 A1 Feb. 10, 2022

Related U.S. Application Data

(60) Provisional application No. 63/061,271, filed on Aug. 5, 2020.

(51) Int. Cl.
*B41J 3/01* (2006.01)
*B41J 2/045* (2006.01)
*B41J 2/355* (2006.01)
*B41J 3/407* (2006.01)

(52) U.S. Cl.
CPC ............... *B41J 3/01* (2013.01); *B41J 2/0451* (2013.01); *B41J 2/04505* (2013.01); *B41J 2/355* (2013.01); *B41J 3/4075* (2013.01)

(58) Field of Classification Search
CPC ... B41J 3/01; B41J 3/445; B41J 3/4075; B41J 2/04505; B41J 2/0451; B41J 2/355; G01G 23/42
See application file for complete search history.

(56) References Cited

U.S. PATENT DOCUMENTS

| 4,453,166 | A | 6/1984 | Enoto |
| 6,188,423 | B1 | 2/2001 | Pou |
| 6,846,055 | B2 | 1/2005 | Cartwright |
| 10,618,312 | B2 | 4/2020 | Nishimura |
| 2011/0181677 | A1 | 7/2011 | Imaizumi |

*Primary Examiner* — Kristal Feggins
(74) *Attorney, Agent, or Firm* — Thompson Hine LLP

(57) ABSTRACT

A printing device includes a thermal printhead with a plurality of print elements. A controller is configured to identify an out of specification status of at least one print element, wherein the controller is further configured to determine whether printing of a specific print field requires use of the print element having the out of specification status and, if so, to determine whether a print location of the specific print field can be shifted such that the print element having out of specification status will be one of (i) aligned with a gap in the specific print field or (ii) offset to one side of the specific print field. A weighing scale incorporating the printing device is also provided.

18 Claims, 5 Drawing Sheets

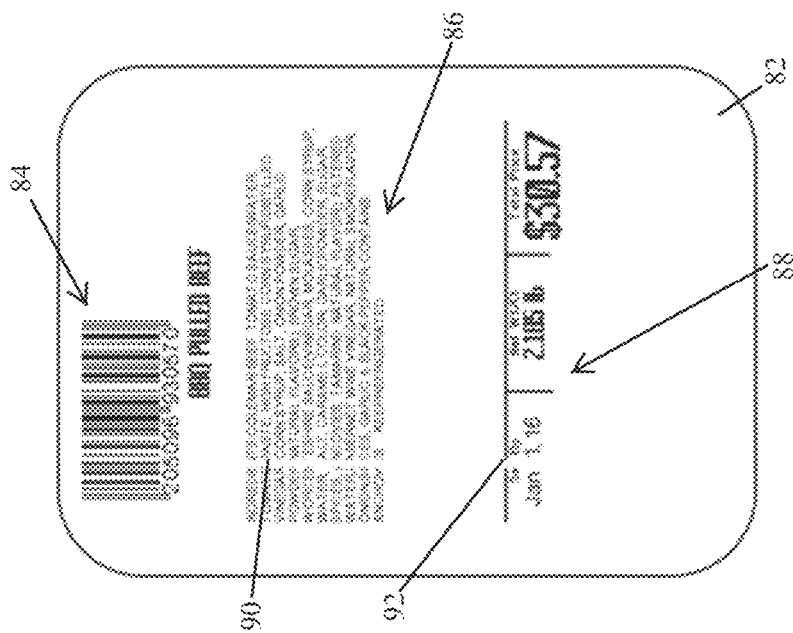
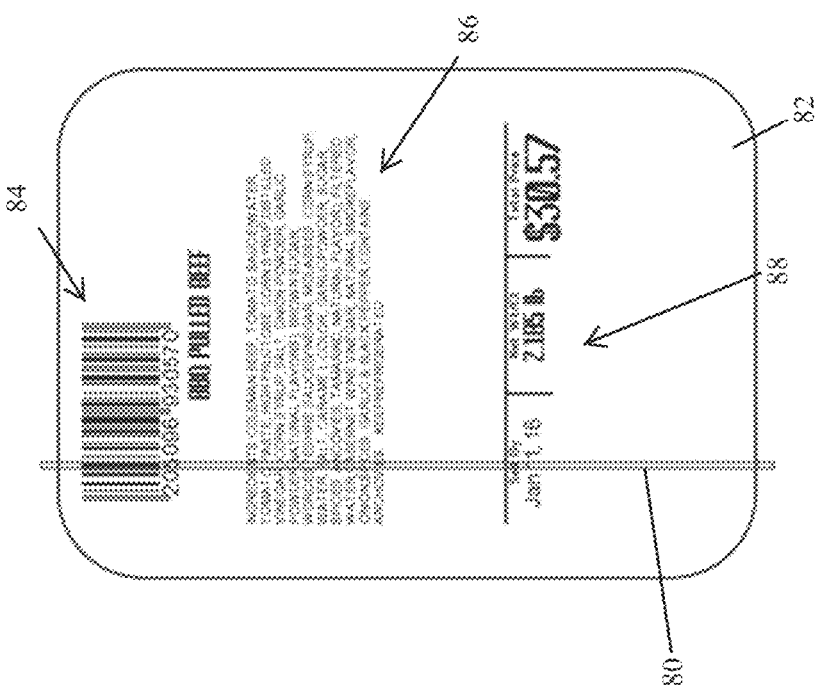
Fig. 5A
Fig. 5B

LABEL PRINTER WITH BARCODE SHIFTING AND SCALE INCORPORATING SUCH A LABEL PRINTER

TECHNICAL FIELD

This application relates generally to thermal printers and, more particularly, to thermal printers used in weighing scales (such as, although not exclusively, weighing scales for retail stores).

BACKGROUND

Thermal printers are used extensively in situations such as the retail trade, for printing product labels, for example. The labels may have printed on them such things as textual information, logos and product bar codes formed as a series of dots.

An exemplary thermal printer is a type of printer in which the image is produced by localized heating of paper that has a very thin thermosensitive coating containing two separate and colorless components, a color former and a dyestuff. The heating is by resistive elements or "dots" typically arranged in a row in a printhead. When heated, the color former melts and combines with the previously colorless dyestuff to make a visible mark. The thermal printer can also burn a black dot directly onto the print stock (e.g., label paper or receipt paper).

Each heating element or dot has a limited lifespan and may only be activated a limited number of times before the element or dot begins to wear out. Eventually, the heating element or dot fails completely.

U.S. Pat. No. 6,846,055 describes a "code checker" technology that evaluates the status of each dot and determines if the dot is fine, marginal (will fail soon), or is already failed. The code checker technology determines if a current value proportional to the resistance of each printhead element exceeds a predetermined multiplier of the nominal value, in which case the printhead element is identified as marginal. This determination is made, per the exemplary embodiment in U.S. Pat. No. 6,846,055, using measuring means comprising a voltage source for applying a voltage across a fixed resistor sequentially connected in series with each element to form a potential divider, and means for measuring a potential difference across each element. The code checker technology disables printing for a dot that is marginal, unless something very important is being printed, like a barcode that needs to be scannable. By disabling marginal printhead dots in circumstances other than critical information printing, the life of the marginal dots, and thus the useful life of the printhead, is extended.

The code checker technology can be implemented for other important print fields, beyond bar codes, such as allergen information or total price. However, even the code checker technology has its limits in terms of prolonging dot life.

Accordingly, it would be desirable to (i) provide the ability to further extend the dot life of marginal dots/print elements of thermal printers and/or (ii) provide the ability to reduce the adverse impact of any failed dots/print elements.

SUMMARY

In one aspect, a printing device includes a thermal printhead with a plurality of print elements. A controller is configured to identify a marginal status of at least one print element. The controller is further configured to determine whether printing of a bar code print field requires use of the marginal status print element and, if so, to shift the bar code print field such that the marginal status print element will be aligned with a gap between lines of the bar code print field.

In another aspect, a printing device, such as the printing device of a food product weighing and pricing scale, includes a thermal printhead with a plurality of print elements. A controller is configured to identify a marginal status of at least one print element, wherein the controller is further configured to determine whether printing of a bar code print field made up of multiple parallel lines requires use of the print element having the marginal status and, if so, to shift a print location of the bar code print field on the label such that the print element having the marginal status will be one of (i) aligned with a gap between the parallel lines of the bar code print field or (ii) offset to one side of the bar code print field.

In a further aspect, a printing device, such as a printing device of a food product weighing scale, includes a thermal printhead with a plurality of print elements. A controller is configured to identify an out of specification status of at least one print element, wherein the controller is further configured to determine whether printing of a specific print field requires use of the print element having the out of specification status and, if so, to determine whether a print location of the specific print field can be shifted such that the print element having out of specification status will be one of (i) aligned with a gap in the specific print field or (ii) offset to one side of the specific print field.

In yet another aspect, a method of controlling a print operation of a printing device includes a thermal printhead with a plurality of print elements, involves: identifying an out of specification status of at least one print element; and determining whether printing of a specific print field requires use of the print element having the out of specification status and, if so, determining whether a print location of the specific print field can be shifted such that the print element having out of specification status will be one of (i) aligned with a gap in the specific print field or (ii) offset to one side of the specific print field.

In one implementation of the method aspect, if a determination is made that the print location of the specific print field can be shifted such that the print element having out of specification status will be one of (i) aligned with a gap in the specific print field or (ii) offset to one side of the specific print field, then a corresponding shift of the print location for purpose of a printing operation is implemented.

In one implementation, the out of specification status is a marginal status indicative of limited useful life of the print element.

In one implementation, the specific print field is a bar code field with multipole parallel lines, wherein the corresponding shift of the print location for purpose of a printing operation is implemented such that the print location is aligned with a gap between the parallel lines.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 5A and 5B show printed labels that depict controlled use of a marginal dot for printing only in the bar code field.

DETAILED DESCRIPTION

Figure 1:
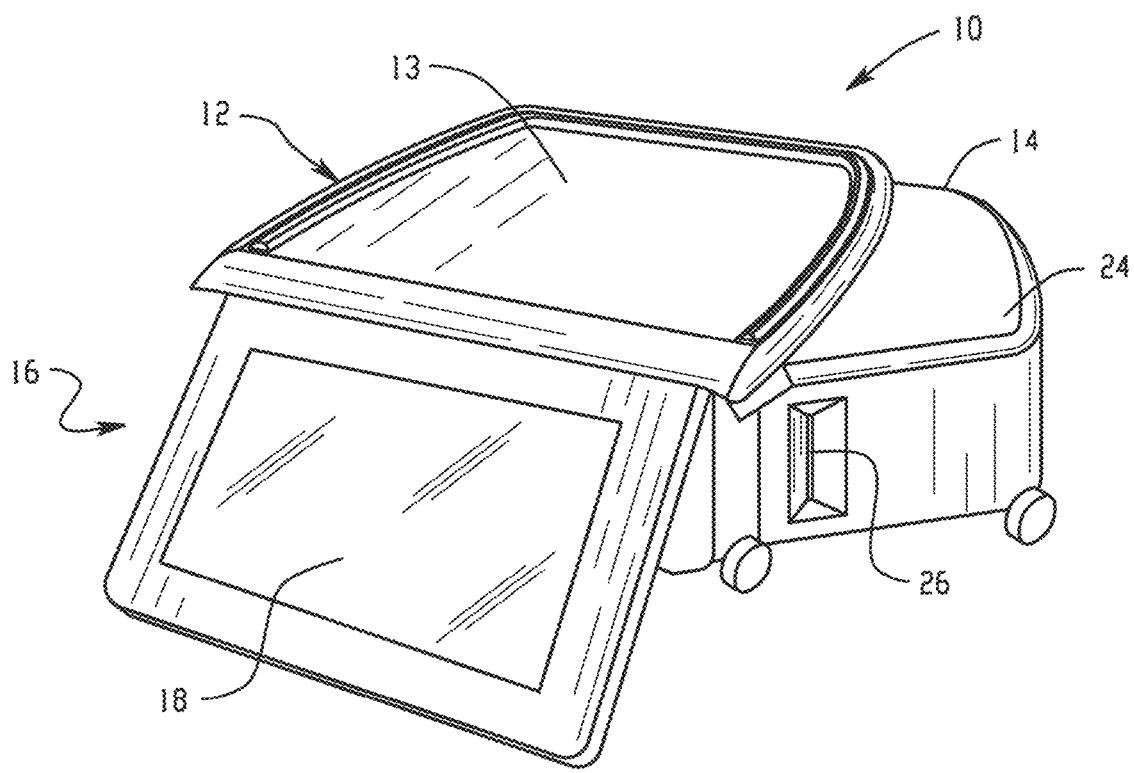
FIGS. 1 and 2 are perspective views of an exemplary weighing apparatus.
Figure 2:
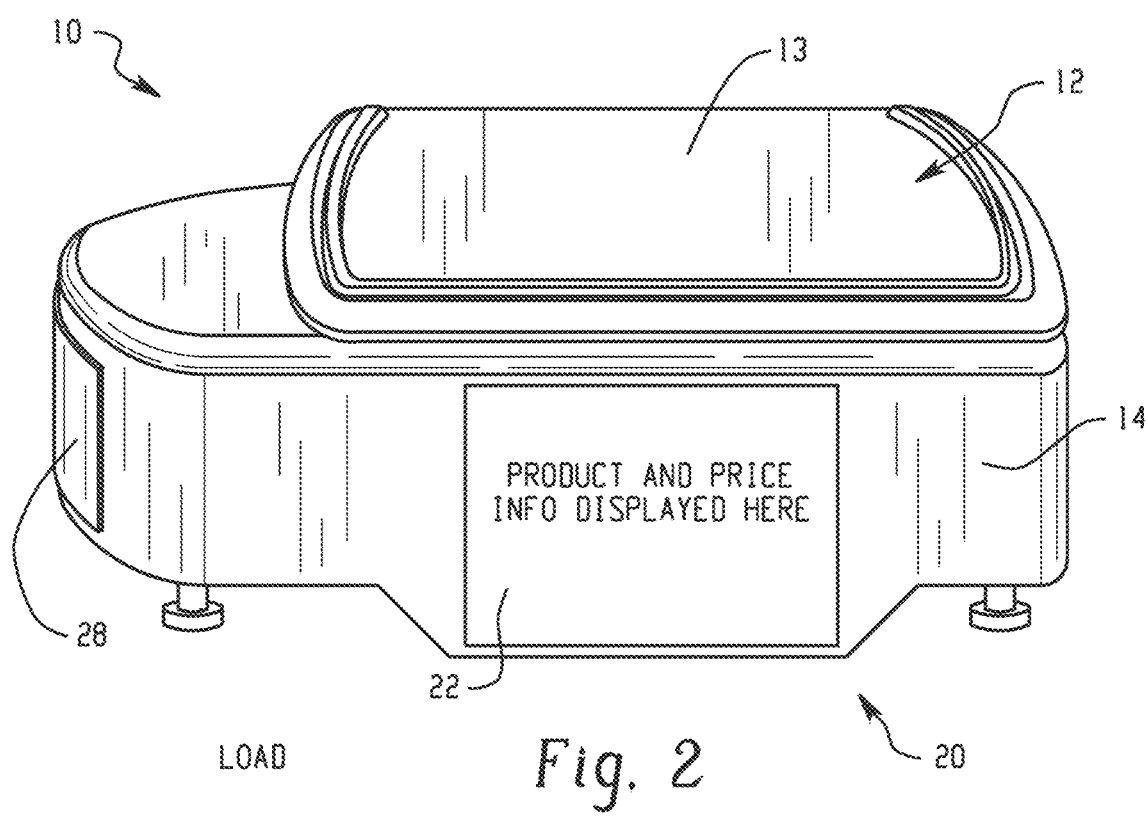
Figure 3:
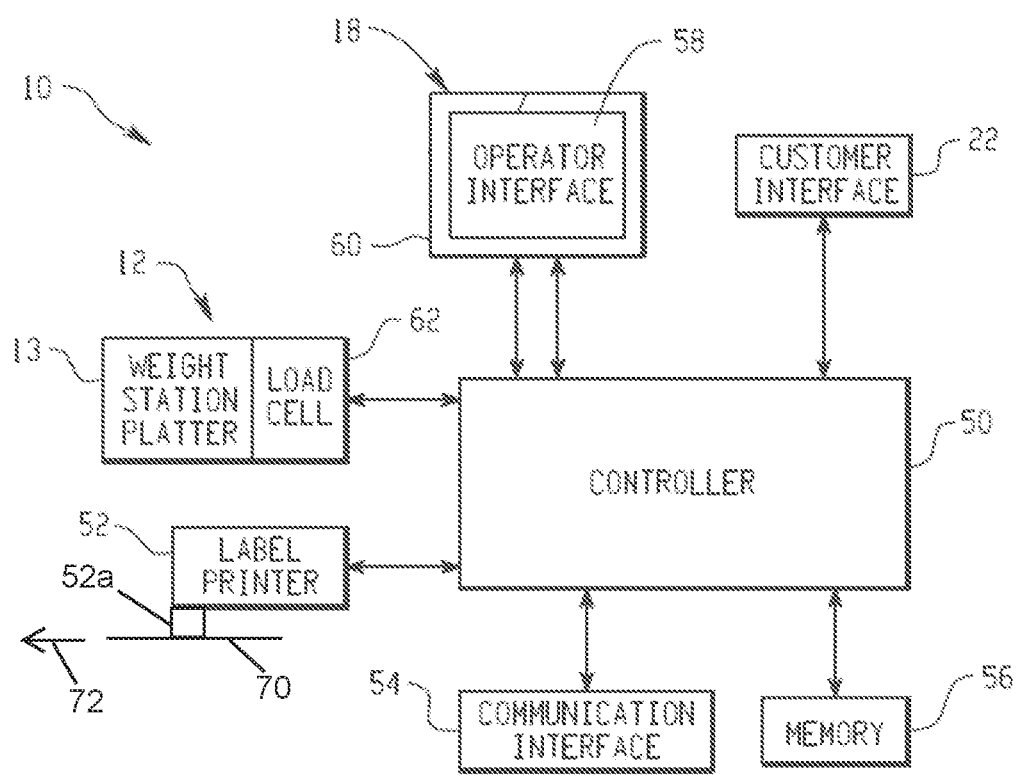
FIG. 3 is a schematic depiction of the weighing apparatus.

Referring to FIGS. 1-3, a weighing apparatus 10 in the form of a food product scale includes a weighing station 12, which in some embodiments may be formed by a weighing platter 13 that can be removed (e.g., for cleaning) from atop the scale housing 14, and having an associated mechanism such as a load cell 62 located internal of the scale housing 14, for producing weight indicative signals when items are placed on the weighing station. An operator interface side 16 of the scale includes an operator interface 18 configured to display information associated with scale operations. By way of example, the operator interface 18 may be formed by a touch-screen display. A customer interface side 20 of the scale includes a customer interface 22, which in certain embodiments may be formed by any suitable display screen technology. It is contemplated that the customer interface 22 need not include touch-screen capabilities, but it is recognized that in certain embodiments touch-screen capability could be incorporated into the customer interface as well.

A side portion 24 of the scale housing includes a label exit slot 26 and incorporates a label printer 52 therein along with a label supply station. The label printer 52 may employ a thermal printhead with resistive heating elements. A removable side panel 28 is provided to access the label supply station for replacement of the labels and to access the label printer and the label path for maintenance etc. Alternatively, member 28 may take the form of a removable cassette.

FIG. 3 shows a high-level schematic depiction of the scale 10, including a controller 50 interconnected with each of the operator interface 18, customer interface 22, weighing station 12, label printer 52 and a communications interface 54, and having associated memory 56. The controller 50 may, for example, be any suitable processor-based controller, including one or more processors, such as a dual-core processor, with associated hardware, software and firmware to achieve desired functionality. As used herein, the term "controller" is intended to broadly encompass the collection of circuits, processors, software, firmware and/or other components that carry out the various operating and processing functions of the scale and its component parts as described herein.

The operator interface 18 may include both a display device 58 and touch-screen panel 60 as shown. The weight station platter 13 is operatively connected to a load cell 62, which produces weight indicative signals. The communication interface 54 may be any suitable type (e.g., as a hardware link, such as a standard network connector, or may be formed by a wireless device such as an RF or infrared transceiver), and it is recognized that multiple communications interfaces may be provided. Memory 56 may, by way of example, take the form of one or more of non-volatile flash memory and/or random access memory, or disk on module or micro-SD. In a typical item weighing operation, an item is placed on the weigh platter 13, the operator identifies the item to the weighing apparatus (e.g., by inputting an item code via the operator interface 18) and the scale controller 50 determines the item weight (e.g., by load cell signal), prices the item (e.g., applying a price per unit weight tied to the item codes) and prints and outputs a pricing label for the item (e.g., with item name, weight, price, ingredients, allergen information, scannable bar code etc.).

Figure 4:
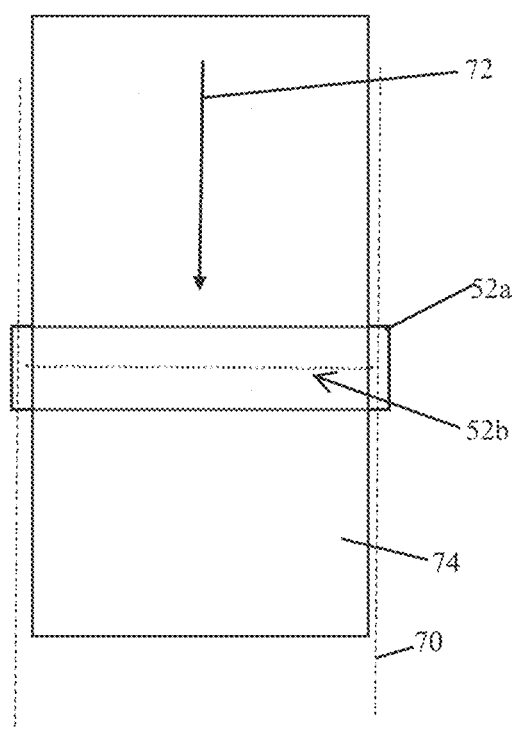
FIG. 4 is a schematic view of a thermal printhead orientation along a label stock feed path.

FIG. 4 shows a schematic depiction of a thermal printhead 52a employed in the weighing apparatus 10. The printhead 52a is positioned along a label stock feed path 70 and includes a linear arrangement of thermal elements or dots 52b arranged generally perpendicular to the feed direction 72 of the label stock 74. The thermal elements or dots 52b may be arranged sufficiently close to each other, across the width of the label stock, such that if adjacent thermal elements are energized at the same time, the appearance on the printed label is that of a consistent marking (e.g., without any substantial gap between adjacent dot marks formed on the label).

The scale controller 50 is configured to measure the resistance of the printhead heating elements 52b to determine when a given element is marginally performing and/or when a heating element has failed. In one example, this is achieved as described in U.S. Pat. No. 6,846,055, which is incorporated herein by reference, by a) periodically determining a current value proportional to the resistance of each element within the thermal printhead and b) providing a warning signal when the current value proportional to the resistance of at least one element exceeds a predetermined multiplier of a nominal value of the resistance of the element.

FIGS. 5A and 5B show implementation of the above mentioned code checker technology. In FIG. 5A, a given dot that will print along the linear zone 80 of a label 82, and the dot, being identified as having an acceptable resistance, is turned on in all fields. In FIG. 5B, the dot is turned on the bar code field (a necessary field) but is turned off in other fields 86 (ingredient field) and 88 (pricing field), resulting in slight gaps 90 and 92 in the print marks of those fields 86 and 88.

Figure 6A:
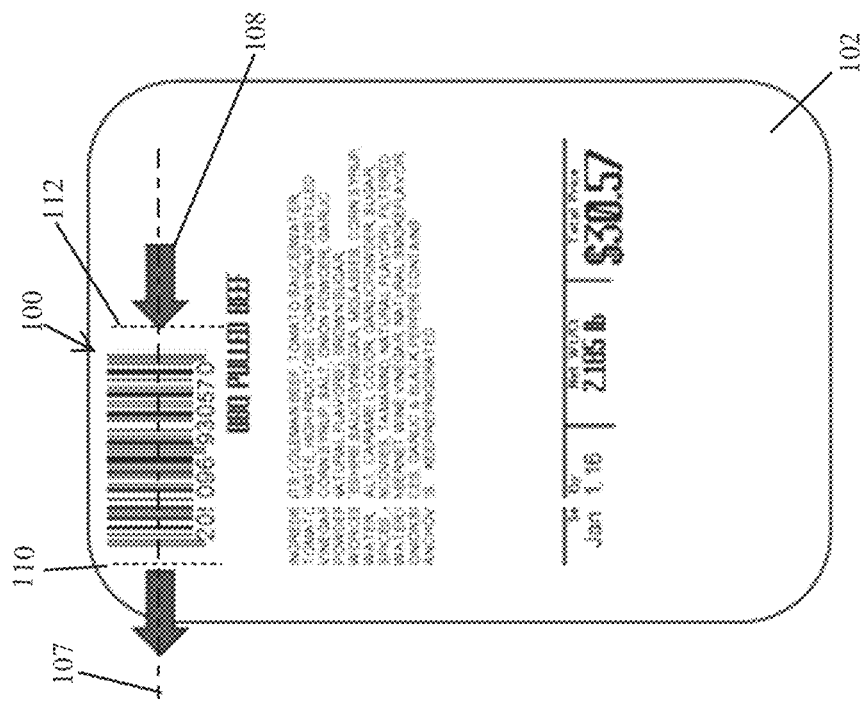
FIGS. 6A and 6B show printed labels that depict selective shift of a bar code print field to avoid use of a marginal dot even in the bar code print field.
Figure 6B:
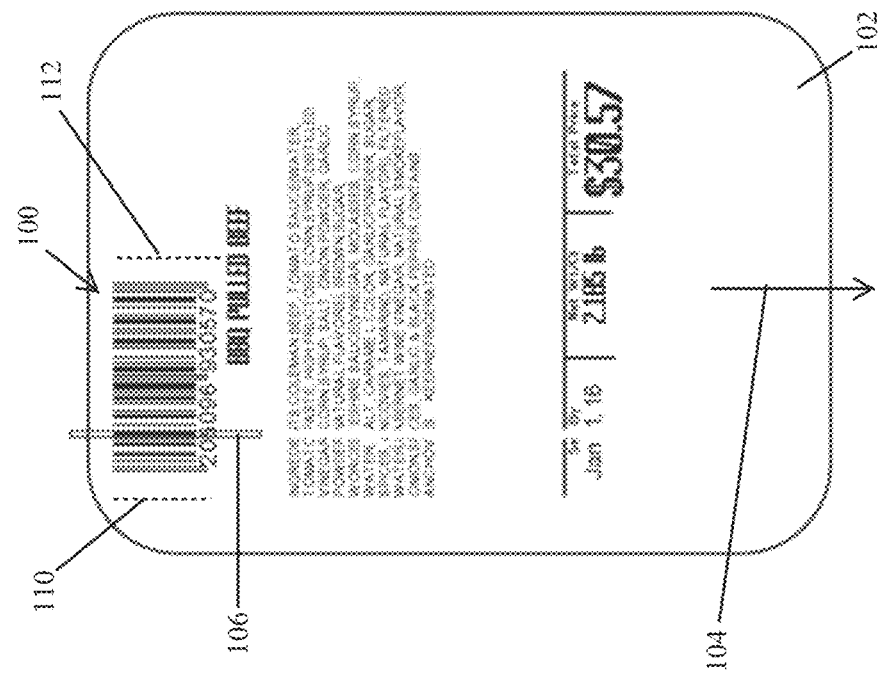

FIGS. 6A and 6B show implementation of a further enhancement involving shifting of the bar code field 100 of a label 102 being printed. As shown, the typical bar code field 100 is made up of a series of parallel lines of varying thickness, with gaps between the lines. The feed direction 104 of the label 102 past the printhead during printing is also shown. In certain cases, if a marginal dot is positioned such that the dot will print in a linear zone 106 that requires printing of a bar code line (per FIG. 6A), the controller is configured to adjust the print operation by shifting the bar code field 100 position on the label 102 slightly left or right (per FIG. 6B) so that the linear print zone 106 of the marginal element or dot either (i) aligns with a gap in the bar code field 102 or (ii) is outside the bar code field. In this way, use of an identified marginal dot for printing even the bar code field can be avoided, further extending printhead useful life.

Moreover, in practice, a printhead with even a failed element or elements (e.g., no current flow through the element(s)) could still be used to print scannable bar codes, if the shifting operation is able to shift the bar code so that the failed element(s) is not/are not needed for printing the bar code. Thus, the shifting could be implemented in the case of a failed element or, in some embodiments, only in the case of a failed element, in order to assure that a scannable bar code is printed. As used herein, the term "out of specification status" for a print element is used to refer to both (i) elements identified as marginal, (ii) elements identified as failed.

In order to achieve the selective bar code shift, the controller 50 evaluates the target position of the required print lines of the bar code field on the label to determine whether any print line will require use of an identified marginal dot of the print head. If so, the controller determines whether the bar code field can be shifted, left or right along a shift axis 107, to align the marginal dot with a gap in the bar code field or to position the marginal dot to the left or right of the bar code field. If so, the controller shifts the target position ai which the bar code field will be printed on the label prior to carrying out the bar code print. In the example of FIGS. 6A and 6B, the target position of the bar code field 100 is shifted in a direction toward the left side edge of the label, per arrows 108. Notably, in the example, the other print fields are not shifted.

The controller 50 may be configured to implement certain limits to make the determination of whether the bar code field can be properly shifted. For example, a set of shift window left and right position limits 110 and 112 may be predefined such that bar code field will not be shifted outside of the left and right positions. Therefore, the controller 50 prevents the shift if the shift would result in movement of the bar code field beyond the set limits, in which case the marginal element or dot will be used for the bar code print.

It is to be clearly understood that the above description is intended by way of illustration and example only, is not intended to be taken by way of limitation, and that other changes and modifications are possible. For example, implementation in connection with printing devices other than printing devices in weighing scales is contemplated. Moreover, shifting of other fields to eliminate the need to print with a marginal dot or failed dot is also contemplated. In this regard, where a label or ticket to be printed is made up of multiple print fields each having a designated print position, each print field may be identified (e.g., in controller memory) according to how the print field should be handled in the case of a marginal dot or failed that is needed to produce the print field. By way of example, the table below demonstrates how a controller can be configured to determine how to deal with each print field:

TABLE 1

Print Field Handling for Marginal Dot(s) and/or Failed Dot(s)

|  | Always Use Marginal Dot for Print if Needed | Shift Field to Avoid Use of Marginal Dot if Possible | Never Use Marginal Dot for Print |
| --- | --- | --- | --- |
| PF #1 | X | — | — |
| PF #2 | — | X | — |
| PF #3 | — | X | — |
| PF #4 | — | — | X |
| PF #5 | — | — | X |

Still other variations are possible.

What is claimed is:

1. A printing device, comprising:
a thermal printhead with a plurality of print elements, the thermal print head positioned along a label stock feed path;
a controller configured to determine whether printing of a specific print field requires use of a print element that has been identified as having an out of specification status and, if so, to determine whether a print location of the specific print field can be shifted, relative to a width of the label stock feed path, such that the print element having the out of specification status will be one of (i) aligned with a gap in the specific print field or (ii) offset to one side of the specific print field.

2. The printing device of claim 1, wherein the controller is configured such that, if the controller determines that the print location of the specific print field can be shifted, relative to the width of the label stock feed path, such that the print element identified as having the out of specification status will be one of (i) aligned with a gap in the specific print field or (ii) offset to one side of the specific print field, then the controller implements a corresponding shift of the print location, relative to the width of the label stock feed path, for purpose of a printing operation.

3. The printing device of claim 1, wherein the controller is configured such that an amount by which the print location of the specific print field can be shifted, relative to the width of the label stock feed path, is restricted by predefined limits.

4. The print device of claim 1, wherein the controller is configured with memory that identifies operational instructions for multiple print fields in the case of print elements identified as having the out of specification status.

5. The printing device of claim 1, wherein the out of specification status is a marginal status indicative of limited useful life of the print element.

6. The printing device of claim 1, wherein the out of specification status is a failed status.

7. The printing device of claim 6, wherein the specific print field is a bar code field with multiple parallel lines, wherein the corresponding shift of the print location, relative to the width of the label stock feed path, for purpose of the printing operation is implemented such that the print element identified as having the out of specification status is aligned with a gap between the parallel lines.

8. A weighing scale incorporating the printing device of claim 7, further comprising:
a weigh platter upon which items to be weighed are placed for weighing;
wherein the controller is further configured to determine item weight, calculate an item priced from the item weight and to define lineage of the bar code print field.

9. A method of controlling a print operation of a printing device includes a thermal printhead with a plurality of print elements, the thermal print head positioned along a label stock feed path, the method comprising:
determining whether printing of a specific print field requires use of a print element identified as having an out of specification status and, if so, determining whether a print location of the specific print field can be shifted, relative to a width of the label stock feed path, such that the print element identified as having the out of specification status will be one of (i) aligned with a gap in the specific print field or (ii) offset to one side of the specific print field.

10. The method of claim 9, further comprising:
if a determination is made that the print location of the specific print field can be shifted, relative to the width of the label stock feed path, such that the print element identified as having the out of specification status will be one of (i) aligned with a gap in the specific print field or (ii) offset to one side of the specific print field, then implementing a corresponding shift of the print location, relative to the width of the label stock feed path, for purpose of a printing operation.

11. The method of claim 9, wherein the out of specification status is a marginal status indicative of limited useful life of the print element.

12. The method of claim 9, wherein the out of specification status is a failed status of the print element.

13. The method of claim 9, wherein the specific print field is a bar code field with multipole parallel lines, wherein the corresponding shift of the print location, relative to the width of the label stock feed path, for purpose of a printing operation is implemented such that the print element identified as having the out of specification status is aligned with a gap between the parallel lines.

14. The method of claim 9, wherein the printing device is incorporated into a weighing scale that determines and item weight, calculates an item price from the item weight and defines lineage of the bar code print field.

15. A printing device, comprising:
- a thermal printhead with a plurality of print elements, the thermal print head positioned along a label stock feed path;
- a controller configured to determine whether printing of a bar code print field made up of multiple parallel lines requires use of a failed print element and, if so, to shift a print location of the bar code print field, relative to a width of the label stock feed path, such that the failed print element will be one of (i) aligned with a gap between the parallel lines of the bar code print field or (ii) offset to one side of the bar code print field.

16. The printing device of claim 15, wherein the controller is configured to shift the print location of the bar code print field, relative to the width of the label stock feed path, along an axis that runs perpendicular to parallel lines of the bar code print field.

17. The printing device of claim 16, wherein the controller is configured such that an amount by which the print location of the bar code print field can be shifted, relative to the width of the label stock feed path, is restricted by predefined limits.

18. A weighing scale incorporating the printing device of claim 15, further comprising:
- a weigh platter upon which items to be weighed are placed for weighing,
- wherein the controller is further configured to determine item weight, calculate an item priced from the item weight and to define lineage of the bar code print field.

* * * * *